A. E. BEACH.
Car Truck.
No. 64,401.  Patented May 7, 1867.
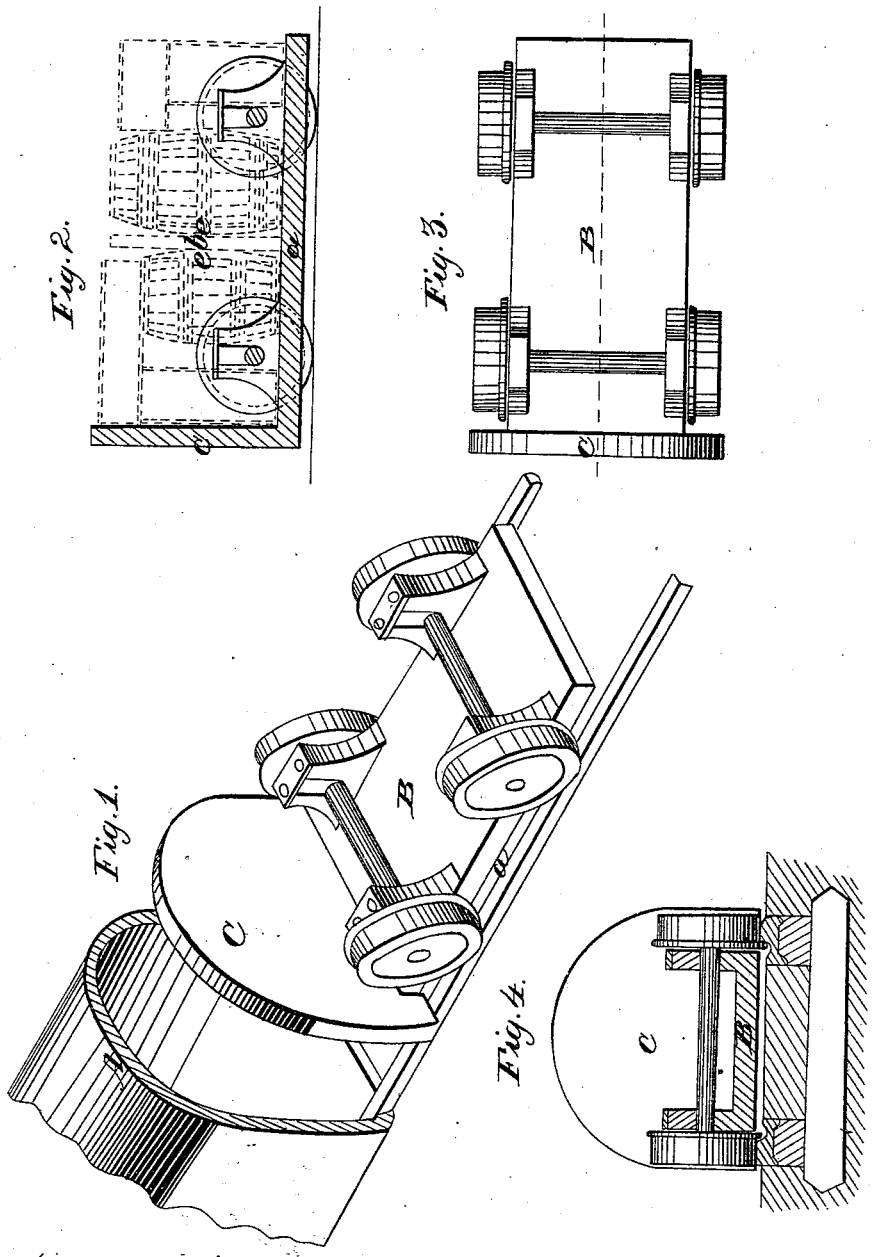

United States Patent Office.

A. ELY BEACH, OF STRATFORD, CONNECTICUT.

Letters Patent No. 64,401, dated May 7, 1867.

IMPROVED PNEUMATIC CAR-TRUCK.

The Schedule referred to in these Letters Patent and making part of the same.

TO ALL WHOM IT MAY CONCERN:

Be it known that I, A. ELY BEACH, of Stratford, Fairfield county, State of Connecticut, have invented a new and useful improvement in Pneumatic Trucks; and I do hereby declare that the following is a clear and exact description, sufficient to enable any person skilled in the art to make and use my improvement. In the accompanying drawing, which forms a part of this specification—

A is the pneumatic tube, of the usual construction, and B is the pneumatic truck intended to travel in the said tube. The truck is provided with the usual car-wheels. The platform $a$ of the truck is hung below the bearings of the wheels, so as to facilitate the loading of the truck, the platform being near the ground or floor of the tube. Attached to one end of the truck is a valve-board or plate, C, and when this valve-board is attached to the truck, the latter can be propelled by the air currents in the pneumatic tube in the usual manner. The valve-board C may be either fixed upon the truck B or may be movable, so as to be placed upon any part of the truck, where the load of freight to be carried may render it desirable. In Figure 2 $b$ shows a movable valve-board, kept in place by means of stakes $e\ e$ upon each side, which are also removable like the stakes of an ordinary cart.

Having thus described my invention, I claim, and desire to secure by Letters Patent—

The employment of pneumatic trucks, made substantially as herein shown and described.

A. ELY BEACH.

Witnesses:
 WM. TREWIN,
 WM. F. MCNAMARA.